(12) United States Patent
Tooley et al.

(10) Patent No.: US 12,504,369 B1
(45) Date of Patent: Dec. 23, 2025

(54) VERTICAL EMISSIONS MONITORING MANIFOLD

(71) Applicant: ECOTEC SOLUTIONS, INC., Colton, CA (US)

(72) Inventors: Jamie Tooley, Beaumont, CA (US); Mitchal Cassel, Redlands, CA (US)

(73) Assignee: ECOTEC SOLUTIONS, INC., Colton, CA (US)

( * ) Notice: Subject to any disclaimer, the term of this patent is extended or adjusted under 35 U.S.C. 154(b) by 184 days.

(21) Appl. No.: 18/481,895

(22) Filed: Oct. 5, 2023

Related U.S. Application Data (60) Provisional application No. 63/382,465, filed on Nov. 4, 2022.

(51) Int. Cl.
| | |
|---|---|
| *G01N 21/39* | (2006.01) |
| *G01M 3/04* | (2006.01) |
| *G01N 33/00* | (2006.01) |

(52) U.S. Cl.
CPC ............. *G01N 21/39* (2013.01); *G01M 3/04* (2013.01); *G01N 33/0027* (2013.01)

(58) Field of Classification Search
CPC ...... G01N 21/39; G01N 33/0027; G01M 3/04
See application file for complete search history.

(56) References Cited

U.S. PATENT DOCUMENTS

| | | |
|---|---|---|
| 2,994,344 A | 8/1961 | Kerley |
| 4,491,730 A | 1/1985 | Pedersen |
| 4,578,762 A | 3/1986 | Wong |

(Continued)

FOREIGN PATENT DOCUMENTS

| | | |
|---|---|---|
| AU | 2003232276 A1 | 12/2003 |
| CN | 105257408 A | 1/2016 |

(Continued)

OTHER PUBLICATIONS

Basu et al., "In situ simultaneous measurements of temperature and water partial pressure in a PEM fuel cell under steady state and dynamic cycling," Journal of Power Sources, Elsevier, Amsterdam, NL, vol. 159, No. 2, Ib Jan. 2006, pp. 987-994.

(Continued)

*Primary Examiner* — Jamil Ahmed
(74) *Attorney, Agent, or Firm* — Knobbe, Martens, Olson & Bear, LLP (57) ABSTRACT

A gas emission monitoring system is configured for versatile deployment across various sites, including gas extraction locations, industrial settings, and environmental monitoring areas. The system may include a support structure holding a plurality of tubings, each equipped with at least one intake port. The tubings may be interconnected through a connecting tubing that ultimately links to an analysis tubing feeding into a gas analyzer. The design ensures that the intake ports are strategically positioned at different vertical levels relative to the ground, for example, for optimized air sampling. The gas analyzer may be configured to identify multiple types of gas content in a received air mixture, which is collected from the various intake ports. Thus, the systems discussed herein may provide a comprehensive, adaptable solution for real-time gas monitoring, capable of handling a broad range of gases and environmental conditions.

17 Claims, 6 Drawing Sheets

(56) References Cited

U.S. PATENT DOCUMENTS

| | | | |
|---|---|---|---|
| 4,676,313 | A | 6/1987 | Rinaldi |
| 4,890,672 | A | 1/1990 | Hall |
| 4,943,161 | A | 7/1990 | Michaelis et al. |
| 5,146,092 | A | 9/1992 | Apperson et al. |
| 5,453,621 | A | 9/1995 | Wong |
| 5,695,641 | A | 12/1997 | Cosulich et al. |
| 5,705,816 | A | 1/1998 | Ronge et al. |
| 5,977,546 | A | 11/1999 | Carlson |
| 6,061,637 | A | 5/2000 | Sorge et al. |
| 6,169,962 | B1 | 1/2001 | Brookshire et al. |
| 6,832,164 | B1 | 12/2004 | Stella et al. |
| 6,995,846 | B2 | 2/2006 | Kalayeh et al. |
| 6,999,883 | B1 | 2/2006 | Brady et al. |
| 7,027,931 | B1 | 4/2006 | Jones et al. |
| 7,075,653 | B1 | 7/2006 | Rutherford |
| 7,352,463 | B2 | 4/2008 | Bounaix |
| 7,499,169 | B2 | 3/2009 | Hurvitz et al. |
| 8,021,612 | B2 | 9/2011 | Tooley |
| 8,404,184 | B2 | 3/2013 | Tooley |
| 9,167,100 | B2 | 10/2015 | Bang |
| 9,189,944 | B2 | 11/2015 | Johnson et al. |
| 10,440,168 | B2 | 10/2019 | Endo |
| 10,533,965 | B2 | 1/2020 | Wang et al. |
| 10,554,886 | B2 | 2/2020 | Rydberg |
| 10,705,063 | B2 | 7/2020 | Campanella et al. |
| 10,775,297 | B2 | 9/2020 | Jourdainne |
| 10,928,371 | B1 | 2/2021 | Smith et al. |
| 11,222,477 | B2 | 1/2022 | Moon et al. |
| 11,313,752 | B2 | 4/2022 | Jourdan |
| 11,867,815 | B2 | 1/2024 | Sun et al. |
| 11,867,816 | B2 | 1/2024 | Sun et al. |
| 2002/0150516 | A1 | 10/2002 | Pahlman et al. |
| 2003/0072009 | A1 | 4/2003 | Domash et al. |
| 2004/0079887 | A1 | 4/2004 | May |
| 2005/0018193 | A1 | 1/2005 | Chilese et al. |
| 2005/0036147 | A1 | 2/2005 | Sterling et al. |
| 2005/0134859 | A1 | 6/2005 | Kalayeh et al. |
| 2006/0119851 | A1 | 6/2006 | Bounaix |
| 2006/0288799 | A1 | 12/2006 | Kielb et al. |
| 2007/0224085 | A1 | 9/2007 | Tooley |
| 2007/0229834 | A1 | 10/2007 | Patel et al. |
| 2008/0088821 | A1 | 4/2008 | Hurvitz et al. |
| 2008/0123712 | A1 | 5/2008 | Zhou et al. |
| 2009/0200180 | A1 | 8/2009 | Capote et al. |
| 2009/0217772 | A1 | 9/2009 | Reeve |
| 2010/0275702 | A1 | 11/2010 | Kinback et al. |
| 2012/0011104 | A1 | 1/2012 | Tooley |
| 2012/0062895 | A1 | 3/2012 | Rao |
| 2012/0287418 | A1 | 11/2012 | Scherer et al. |
| 2012/0297868 | A1 | 11/2012 | Elkins |
| 2013/0044314 | A1 | 2/2013 | Koulikov et al. |
| 2014/0034840 | A1 | 2/2014 | Davenport et al. |
| 2014/0034970 | A1 | 2/2014 | Li et al. |
| 2014/0349707 | A1 | 11/2014 | Bang |
| 2015/0177208 | A1 | 6/2015 | Murphy |
| 2015/0362468 | A1 | 12/2015 | Gerhold |
| 2016/0266034 | A1 | 9/2016 | Helbley et al. |
| 2017/0090486 | A1 | 3/2017 | Chrin |
| 2017/0356552 | A1 | 12/2017 | Cassel |
| 2018/0059003 | A1 | 3/2018 | Jourdainne |
| 2018/0268581 | A1 | 9/2018 | Demuth |
| 2020/0086365 | A1 | 3/2020 | Campanella et al. |
| 2021/0302267 | A1 | 9/2021 | Tao et al. |
| 2021/0318236 | A1 | 10/2021 | Sun et al. |
| 2021/0321174 | A1 | 10/2021 | Sun et al. |
| 2022/0113290 | A1 | 4/2022 | Smith et al. |
| 2023/0314261 | A1* | 10/2023 | Schulte .............. G01N 1/26 73/40 |
| 2024/0027338 | A1 | 1/2024 | Vidal |
| 2024/0061120 | A1 | 2/2024 | Sun et al. |
| 2024/0201053 | A1 | 6/2024 | Tooley |

FOREIGN PATENT DOCUMENTS

| | | |
|---|---|---|
| CN | 105372199 A | 3/2016 |
| CN | 205538667 U | 8/2016 |
| CN | 107024440 A | 8/2017 |
| CN | 107035972 A | 8/2017 |
| CN | 206740177 U | 12/2017 |
| CN | 207471129 U | 6/2018 |
| CN | 207527300 U | 6/2018 |
| CN | 108399717 A | 8/2018 |
| CN | 109030374 A | 12/2018 |
| CN | 208705222 U | 4/2019 |
| DE | 4323283 A1 | 2/1994 |
| EP | 1070943 A1 | 1/2001 |
| GB | 2286458 A | 8/1995 |
| WO | 93/15391 A1 | 8/1993 |
| WO | 2003/103864 A1 | 12/2003 |
| WO | 2004/023114 A1 | 3/2004 |
| WO | 2005/047872 A1 | 5/2005 |
| WO | 2013/175287 A2 | 11/2013 |
| WO | 2017/173402 A2 | 10/2017 |
| WO | 2018/038152 A1 | 3/2018 |

OTHER PUBLICATIONS

Cattaneo H et al., "VCSEL based detection of water vapor near 940nm" Spectrochimica Acta. Part A: Molecular and Biomolecular Spectroscopy, Elsevier, Amsterdam, NL, vol. 60, No. 14, Dec. 2004, pp. 3269-3275.

Extended European Search Report for 17187635.2 dated Jan. 2, 2018 in 28 pages.

Extended European Search Report, dated Aug. 5, 2024, in European Application No. EP 21865065.3.

International Preliminary Report on Patentability, re PCT Application No. PCT/CN2019/100307, dated Feb. 25, 2021.

International Preliminary Report on Patentability, re PCT Application No. PCT/US07/16449, dated Jan. 20, 2009.

International Preliminary Report on Patentability, re PCT Application No. PCT/US2021/048738, dated Mar. 16, 2023.

International Search Report and Written Opinion, re PCT Application No. PCT/CN2019/100307, dated Oct. 30, 2019.

International Search Report and Written Opinion, re PCT Application No. PCT/US02/28377, dated Sep. 5, 2003.

International Search Report and Written Opinion, re PCT Application No. PCT/US07/16449, dated Mar. 17, 2008.

International Search Report and Written Opinion, re PCT Application No. PCT/US2021/048738, dated Dec. 22, 2021.

Office Action, dated Jul. 10, 2025, in European Application No. EP 21865065.3.

Phone interview itinerary for Apr. 27, 2011.

Search Report for Application No. GB 0701867.4, filed Jan. 31, 2007.

Song K et al., "Application of laser photoacoustic spectroscopy for the detection of water vapor near 1.38 mum," Microchemical Journal, New York, NY, US, vol. 80, No. 2, Jun. 2005, pp. 113-119.

* cited by examiner

VERTICAL EMISSIONS MONITORING MANIFOLD

BACKGROUND

Gas extraction sites, such as those for methane production, have multiple wellheads that extract gas from underground locations. These wellheads are often fitted with various components like connectors, valves, and ports that are susceptible to wear and tear due to atmospheric conditions and regular use. As a result, leaks may develop over time, leading to the unintended release of gases like methane into the atmosphere. Such leaks pose risks to air quality and can be hazardous to both humans and animals in the vicinity. In extreme cases, the release of methane can even cause fires or explosions.

SUMMARY

The systems and methods discussed herein address certain limitations of existing gas monitoring systems. In one embodiment, a gas analyzer is configured to detect low concentrations of various gases, such as at a parts-per-billion level. In some implementations, a gas monitor comprises one or more tunable diode lasers (TDL) that allows high accuracy and minimal warm-up time.

In some embodiments, a site planning module uses prevailing wind information to determine the optimal placement and quantity of monitors at a gas extraction site. This ensures maximized detection efficacy based on environmental conditions.

In some embodiments, a detection module is configured to model gas plumes for identification and quantification of leak sources, thereby providing a comprehensive solution for monitoring and managing gas extraction sites.

In some aspects, the techniques described herein relate to a vertical emission monitoring system including: a longitudinal support rod configured to be positioned at a gas extraction site; a first tubing having a first intake port attached at a first end and a second intake port attached at a second end; a second tubing having a third intake port attached at a first end and a fourth intake port attached at a second end; a third tubing coupled: at a first end to the first tubing at a middle of a length of the first tubing; and at a second end to the second tubing at a middle of a length of the second tubing; a fourth tubing coupled: at a first end to the third tubing at a middle of a length of the third tubing; and at a second end to an input port of a gas analyzer; wherein the tubings are attached to the longitudinal support rod to maintain positions of the intake ports at different positions related to ground level; the gas analyzer configured to identify methane content in an air mixture received via the fourth tubing, wherein the air mixture includes substantially equal portions of air from each of the first, second, third, and fourth intake ports; and an alert component configured to compare the identified methane content in the air mixture to a threshold level and, if the identified methane content is above the threshold level, initiate delivery of an electronic alert to one or more remote computing devices.

In some aspects, the techniques described herein relate to a vertical emission monitoring system, further including: a battery configured to provide power to the gas analyzer; and one or more solar panel configured to generate electrical power from sunlight and recharge the battery.

In some aspects, the techniques described herein relate to a vertical emission monitoring system, wherein the longitudinal support rod includes a plurality of telescoping sections so that a total height of the longitudinal support rod is manually settable to range of heights.

In some aspects, the techniques described herein relate to a vertical emission monitoring system, wherein the first, second, third, and fourth intake ports are positioned at about five feet, ten feet, fifteen feet, and twenty feet, respectively.

In some aspects, the techniques described herein relate to a vertical emission monitoring system, further including a wireless communication module configured to wirelessly transmit the identified methane content.

In some aspects, the techniques described herein relate to a vertical emission monitoring system, wherein the gas analyzer is further configured to measure one or more of a temperature, a pressure, a humidity, or a chemical composition of the air mixture.

In some aspects, the techniques described herein relate to a vertical emission monitoring kit including: a support rod configured to be positioned at a first location of a gas monitoring site; a first intake port configured to be attached to the support rod at a first height above the ground; a second intake port configured to be attached to the support rod at a second height above the ground that is larger than the first height; a tubing configured to be cut into two or more tubing sections including a first tubing section and a second tubing section; one or more attachment members configured to secure tubing sections to the support rod; and two or more T-junction connectors each including two input ports and one output port, wherein input ports of a first T-junction connector are configured to couple with the first intake port and the second intake port so that a mixture of air at the first height and second height exits the output port; wherein the second tubing section is configured to be coupled to a gas analyzer configured to identify content of one or more gas constituent in the mixture of air gas.

In some aspects, the techniques described herein relate to a vertical emission monitoring kit, wherein the attachment members are zip ties.

In some aspects, the techniques described herein relate to a vertical emission monitoring kit, wherein the gas analyzer includes one or more laser sensor.

In some aspects, the techniques described herein relate to a vertical emission monitoring kit, further including: a second support rod configured to be positioned at a second location at the gas monitoring site; a fourth intake port configured to be attached to the second support rod at a fourth height above the ground; and a fifth intake port configured to be attached to the second support rod at a fifth height above the ground that is higher than the fourth height; wherein input ports of a second T-junction connector are configured to couple with the fourth intake port and the fifth intake port, and the output port of the second T-junction connector is coupled to a second gas analyzer configured to identify content of one or more gas constituent in a second mixture of air at the second location of the gas monitoring site.

In some aspects, the techniques described herein relate to a vertical emission monitoring kit, wherein the first and second locations are along a border of a gas extraction site.

In some aspects, the techniques described herein relate to a gas emission monitoring system including: a support structure configured for placement at a site, the site including one or more of a gas extraction site, an industrial site, or an environmental monitoring location; a plurality of tubings, each having at least one intake port attached at one or more ends; a connecting tubing coupled: at a first end to at least one of said plurality of tubings; and at a second end to another of said plurality of tubings; an analysis tubing coupled: at a first end to the connecting tubing; and at a second end to an input port of a gas analyzer; wherein the plurality of tubings are attached to the support structure to maintain positions of the intake ports at various vertical positions relative to a ground level; and the gas analyzer configured to identify one or more types of gas content in an air mixture received via the analysis tubing, wherein the air mixture includes air from each of the intake ports of the plurality of tubings.

In some aspects, the techniques described herein relate to a gas emission monitoring system, further including: an alert component configured to compare the identified gas content in the air mixture to one or more predetermined threshold levels and, if the identified gas content exceeds any of the threshold levels, initiate delivery of an alert to one or more devices.

In some aspects, the techniques described herein relate to a gas emission monitoring system, wherein the one or more devices include one or more of a remote computing device, a mobile device, or a centralized monitoring system.

In some aspects, the techniques described herein relate to a gas emission monitoring system, further including a wind sensor configured to measure wind speed and direction at the gas monitoring site.

In some aspects, the techniques described herein relate to a gas emission monitoring system, further including a site planning module configured to determine placement and configuration of the gas emission monitoring system.

In some aspects, the techniques described herein relate to a gas emission monitoring system, wherein one or more of the tubings include filters to remove particulates from the air mixture before it reaches the gas analyzer.

DETAILED DESCRIPTION

Figure 1:
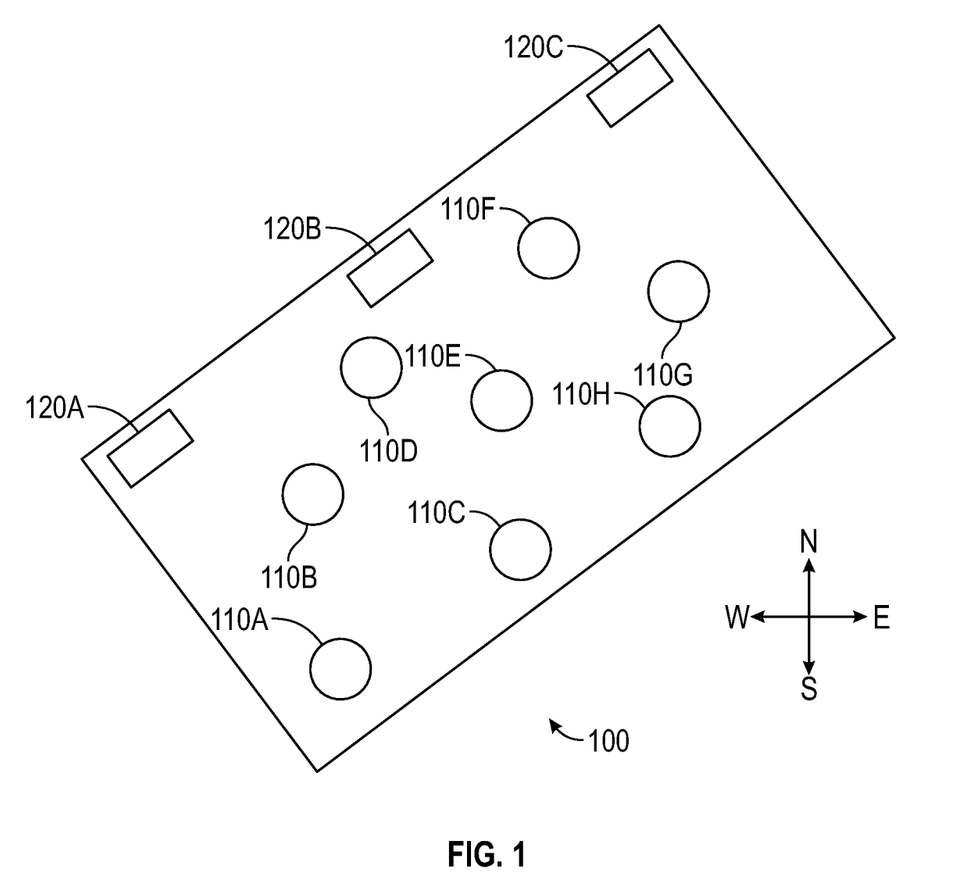
FIG. 1 is a block diagram illustrating a top view of an example gas extraction site, such as a monitoring system that may be located at a methane production site that removes methane (and other gases) from underground.

FIG. 1 is a block diagram illustrating a top view of an example gas extraction site 100, such as a monitoring system that may be located at a methane production site that removes methane (and other gases) from underground. While certain examples herein described detection of methane, the monitoring systems and methods may be used to detect other constituents in gas, such as benzene, hydrogen sulfide, etc.

In the example of FIG. 1, the wellheads 110A-110H are illustrated. Each of the wellheads 110 may include one or more connectors, valves, ports, etc., configured to receive extracted gas via one or more pipes that extend from the wellhead underground to an air intake area that may be 2, 5, 10, 25 or more feet below the surface. In some embodiments, at least some of the wellheads are connected to an underground pipe that moves gas extracted from another location. For example, the wellhead 110 may not extract gas directly from the ground, but may receive gas extracted from other locations within the gas extraction site via an underground (or aboveground) pipe. The wellheads 110 and/or components that extend underground and/or that are associated with the wellhead 110 may develop leaks over time, such as due to atmospheric wear and tear and regular use of the components. Release of methane into the atmosphere via such a leak may contribute to air-quality issues that may impact humans and animals in the area and may cause and/or stoke fire or even explosions. Monitoring and early detection of such leaks is therefore desirable.

In the example of FIG. 1, a northwest border of the gas extraction site 100 includes three vertical emission monitoring manifolds (VEMMs) 120A-120C configured to detect low concentrations of methane in the atmosphere, while minimizing sensing equipment that is required. For example, each of the monitors 120 may detect a concentration of methane in ambient air of less than 100 parts per billion (PPB) or less (e.g., 50 PPB). As discussed further below, each of the monitors 120 includes a gas analyzer configured to sense methane content in a mixed gas sample taken at multiple heights (e.g., via separate air intakes at different heights above ground). In one embodiment, each of the monitors 120 includes a laser-based methane emission sensor that uses tunable diode laser ("TDL") technology. Laser sensors may advantageously require little or no warm-up time, are not affected by cross-gas contamination, and provide accuracy to a parts per billion ("PPB") level. Examples of laser absorption spectroscopy sensors, as well as other environmental sensors and configurations of sensors, are described in U.S. Pat. No. 7,352,463, issued on Apr. 1, 2008, which is hereby incorporated herein by reference in its entirety and for all purposes, including teachings regarding Herriot-type sensing devices. Additionally, the gas analyzers discussed may include one or more sensors configured to detect one or more other parameters of a sample. The sensors may be any type, shape, and/or size. For example, a gas analyzer may include one or more sensor configured to temperature, pressure, humidity, chemical composition, particulate level (e.g., air quality), etc. of gas that is received via an intake port. An "Intake port" may include any opening or fluid entry point.

In some implementations, position(s) and quantity of monitors at a gas extraction site may be determined based primarily on characteristics of a prevailing wind at the site, or absence of a prevailing wind. Prevailing wind information may be obtained from publicly available sources and/or measurements that are taken at or near the site, e.g., by the entity that is generating the VEMM plan for the site. In some embodiments, if there is not a prevailing wind at the site (e.g., the wind does not have a typical direction and or strength), monitors may be planned/placed substantially uniformly at the site (e.g., in the middle of each quadrant of the site). In another example, if there is a prevailing wind at a gas extraction site from West to East, one or more monitors may be place at or near the Eastern border of the gas extraction site. In some embodiments, a software application may receive user input indicating a site location (e.g., boundaries of a gas extraction site) and, in response, automatically access wind information for that site location. The software application may be configured to execute a site planning module to determine position(s) and quantity of monitors that optimizes detection of methane at the site based on the accessed wind information. Additionally, the site planning module may be configured to determine quantity and heights of intake ports of each of the monitors, which may vary from one monitor to another at a single site.

While certain embodiments discussed herein refer to a gas extraction site (e.g., site 100), the monitoring devices discussed herein are usable in other contexts. For example, the gas monitors may be positioned to detect methane and/or other gas constituents in the atmosphere, such as that may be released from leaks, cracks, or even intentional release of gas into the atmosphere from any underground or aboveground sources. Additionally, while certain embodiments herein are discussed with reference to detection of methane content, the gas monitors are equally usable for detection of other gas constituents and/or combinations of gas constituents, such as other noxious or harmful gases.

In some embodiments, a detection module may model gas plumes for identification of a leak source and/or quantification of leak rate of targeted gas and/or gas mixture. For example, measurement data from one or more monitors at a gas extraction site may be transmitted to an analysis system that executes a detection module to determine levels of methane (or other harmful constituents) in sample gas. Based on the measurement data, the detection module may provide a graphical and/or textual interface showing an expected source (or area) where the detective methane is believed to have originated. For example, the source may be calculated based on height at which methane was detected at a monitor, concentration of methane detected at that monitor, height of air intakes at the monitor, wind direction, and/or other factors.

Figure 2:
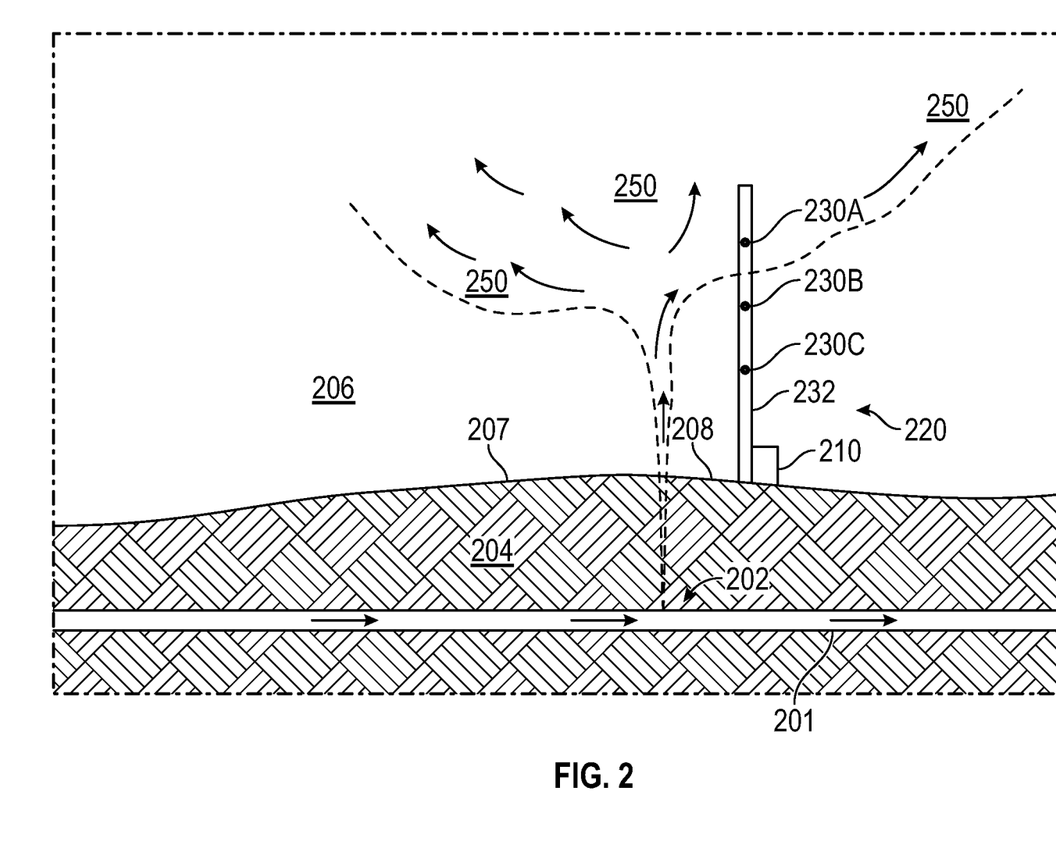
FIG. 2 is a diagram illustrating an example monitor positioned to detect methane leaks, such as from cracks in underground pipes, from an aboveground wellhead, and/or from other component of a gas extraction system.

FIG. 2 is a diagram illustrating an example monitor 220 positioned to detect methane leaks, such as from cracks in underground pipes, from an aboveground wellhead, and/or from other component of a gas extraction system. In this example, a crack 202 in an underground pipe 201 is shown. In this example, some portion of a gas 250 (e.g., a mixture of methane, oxygen, and/or other gases) traveling through the pipe 201 escapes via the crack 202 and rises through the ground 204 to escape into the aboveground atmosphere 206. In this example, the escaping gas 250, which may include substance that are undesirable and/or dangerous to have in the atmosphere, disperses upward generally in the shape of a mushroom cloud. Thus, a sensor that is positioned low to the ground, even if very near the source of the gas, such as at locations 207 and 208 may not detect the methane leak. The monitoring systems and methods discussed herein may be used to detect leaks from other sources, in addition to a cracked underground pipe as shown in FIG. 2, such as leaks, cracks, failures, etc. of any equipment or components associated with storage and/or movement of gas. For example, an above and/or under ground component, such as a compressor, processing equipment, storage tank, etc. may leak gas that includes methane (and/or other gases that a monitoring system is configured to detect).

The example monitor 220 of FIG. 2 advantageously includes multiple air intake ports 230 (e.g., air intake ports 230A, 230B, and 230C) that are configured to intake ambient air at different distances (or levels) above the ground for analysis by a gas analyzer 210. The gas analyzer includes one or more sensors (e.g., a laser or other air constituent sensor(s)) configured to detect a level of methane in the mixed gas. For example, with the escaped gas 250 positioned as shown in FIG. 2, the lower intake ports 230C and 230B intake ambient air that is not mixed with the escaping gas 250 (that may include methane), but the upper intake port 230A intakes air that is mixed with the escaped gas 250 (or, depending on the conditions, only the escaping gas 250). Thus, the methane leak may be detected by analysis at port 230A. In this example, the intake from each of ports 230A, 230B, 230C is mixed in tubing 232 that is connected to the gas analyzer 210. Thus, the single gas analyzer 210 may detect methane that is received via any one or more of the air intake ports 230 by analyzing the mixed gas that is received via the tubing 232. "Tubings," as used herein may refer to any type of fluid conduit or air channel, such as various forms of tubing, piping, or channels that can carry fluids or gases. In some embodiments, the mixed gas includes generally equal amounts of gas from each of the inlet ports (e.g., 1/x from each of x inlet ports of a monitor). In other embodiments the system may be configured to combine different concentration of gas from the inlet ports. For example, aperture size and/or suction at certain inlet ports may be adjusted to obtain a non-uniform mixing of intake air.

Figure 3:
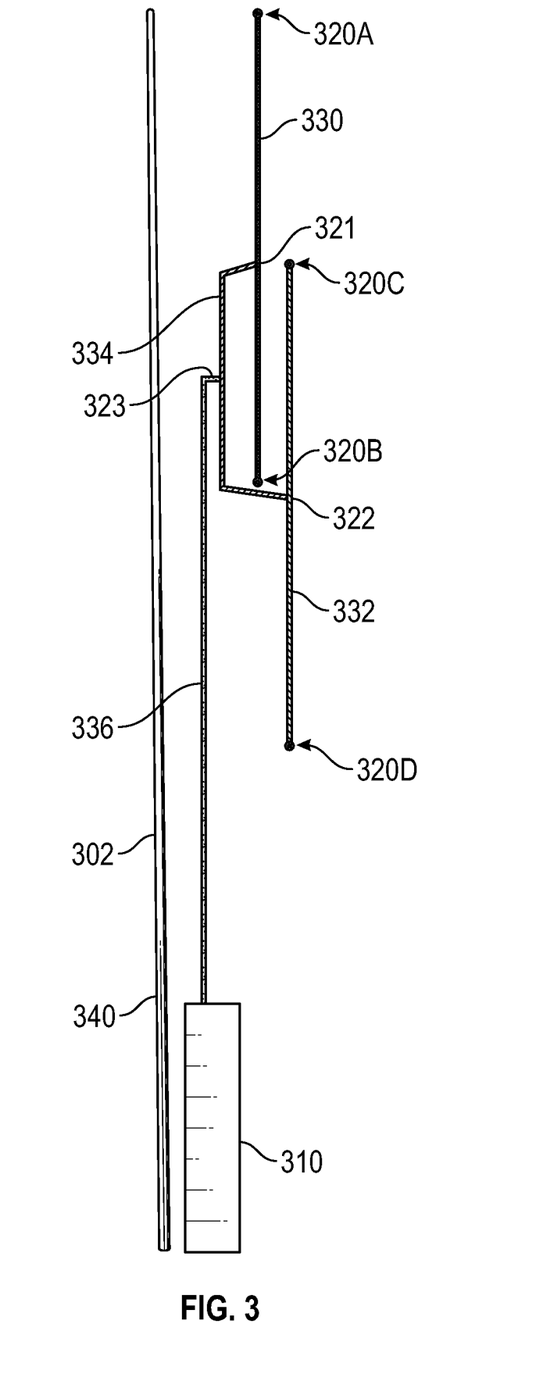
FIG. 3 is a diagram illustrating an example configuration of air intake ports that are combined via tubings to generate a mixed gas that is received at an intake port of a gas analyzer for detection of gas constituents, such as methane content.

FIG. 3 is a diagram illustrating an example configuration of air intake ports 320A-320D that are combined via tubings 330, 332, 334, 336 to generate a mixed gas that is received at an intake port of a gas analyzer 310 for detection of gas constituents, such as methane content. In this example, a first and second intake port 320A, 320B are positioned at opposite ends of an upper tubing 330, such as a flexible 6 mm (or larger, such as ¼ inch or larger) tubing. The intake ports 320A, 320B may be coupled with a connecting tube 334 at a junction point 321 via a T-junction connector, for example. Similarly, a third and fourth intake port 320C, 320D are at opposite ends of a lower tubing 332 and are coupled to the connecting tube 334 at a junction point 322. In this example, the connecting tube 334 includes a junction 323, e.g., a T-junction connector or other connector, that couples the connecting tube 334 to an intake tube 336 that extends downward to the gas analyzer 310. Thus, when a negative pressure is applied at the gas analyzer 310 to the intake tube 336, atmospheric gas that is ambient at the intake ports 320A-320D are combined into a mixed gas that enters a sample port of the gas analyzer 310. In some embodiments, the gas analyzers discussed herein include or are coupled to a pump configured to generate a negative pressure at the sample port of the gas analyzer. Depending on the embodiment, the pump may create a vacuum of about −120" W.C max and/or pressure of about +4 PSI max. Depending on the embodiment, the pump may create a flow rate at sample port of from 200-2,000 ml/min. In other embodiments, air flow into the sample port of the gas analyzer may be generate in other manners and in other amounts.

In other embodiments, a different quantity of air intake ports 320 may be used (e.g., two, four, six, eight, ten, etc.) and/or the intake ports 320 may be combined in different manners than is conceptually illustrated in FIG. 3. The various tubings may be held in place at their respective vertical positions by connections to a support rod 340. For example, the tubings may be connected via zip ties, clamps, straps, etc. to the support rod 340. In some embodiments, the means may be rigid enough to maintain a longitudinal shape without a separate support rod.

The height of the intake ports 320 may vary from one implementation to another also. For example, in a first embodiment with four intake ports, such as an example of FIG. 3, the intake ports may be positioned at 5 ft (320D), 10 ft (320B), 15 ft (320C), and 20 ft (320A). In other embodiments, the intake ports may be positioned starting lower to the ground (e.g., at the ground level or 6 inches above ground level) and may be spaced differently (e.g., positioned every 6 inches, 18 inches, 24 inches, etc., or non-uniform spacing, such as a larger vertical spacing of intake ports closers to the ground surface and narrower spacing at greater heights).

In some implementations, multiple monitors 120 positioned at a same gas monitoring site may be configured differently. For example, with reference to the example gas extraction site 100 of FIG. 1, the first monitor 120A may include air intakes that span from 6 inches to 4 feet above ground while air intakes on monitor 120C span from 3 feet to 8 feet above ground. For example, if the prevailing wind direction at gas extraction site 100 (FIG. 1) is from West to East, leaking gas (e.g., from the ground and/or a wellhead just above the ground), such as from wellheads 110A and 110B near a west side of the site 100 may rise to a higher level as it passes eastward across the site 100.

Figure 4:
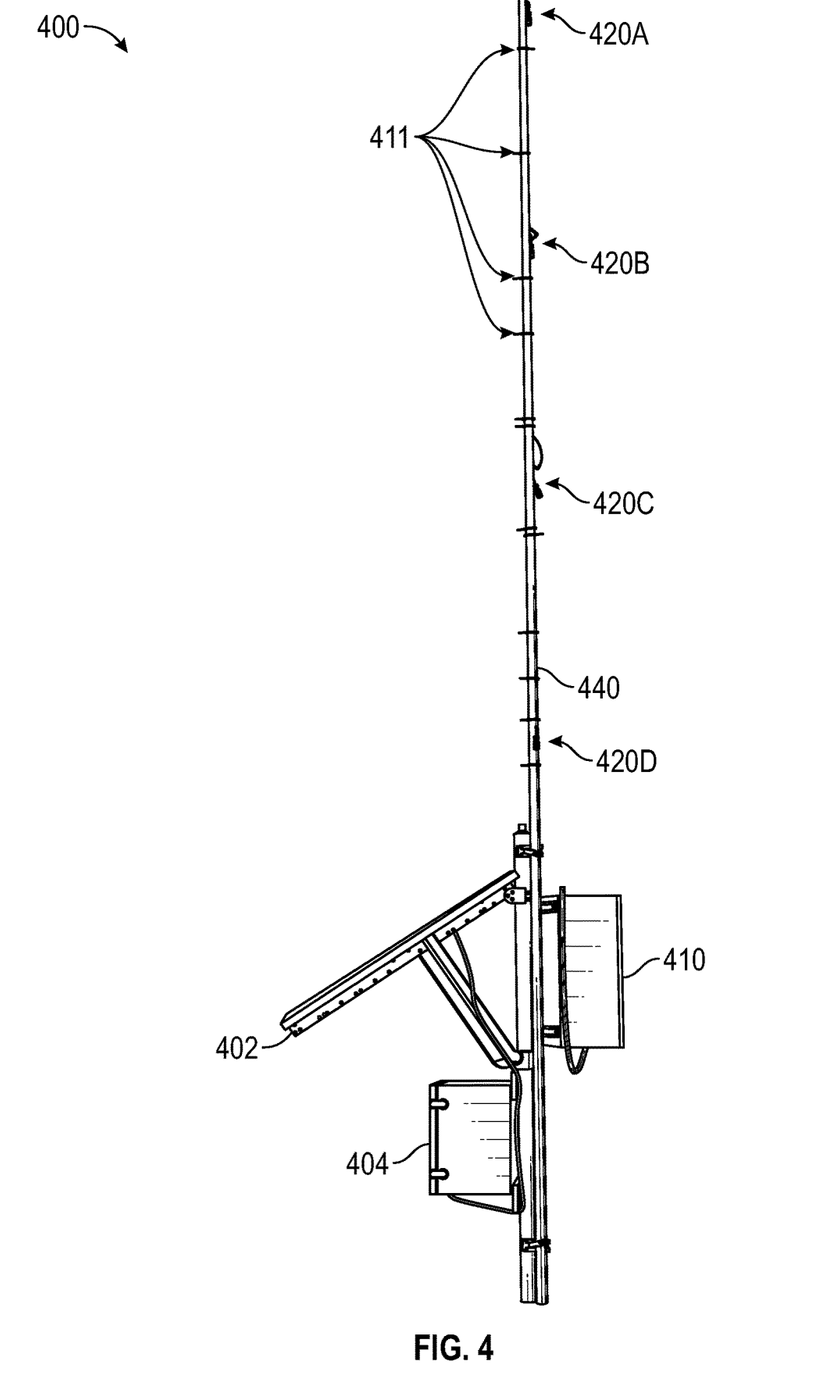
FIG. 4 illustrates another example vertical emission monitoring manifold (VEMM) configured to receive atmospherics samples at multiple heights and sense chemical constituents of a mixed gas.

FIG. 4 illustrates another example vertical emission monitoring manifold (VEMM) 400 configured to receive atmospherics samples at multiple heights and sense chemical constituents of a mixed gas. This example, a support rod 440 maintains position of one or more tubings (not shown) that connect four intake ports 420 (420A, 420B, 420C, 420D). This example, each of the intake ports 420 includes a muffler configured to condition the ambient gas, such as by removing larger particles in the gas (e.g., larger than 20 μm diameter). The muffler may additionally prevent insects and moisture (e.g., from rain or irrigation) from entering tubings. In some embodiment, the muffler comprises a stainless steel mesh. The intake ports 420 may be coupled in a configuration similar to shown in FIG. 3 or in any other configuration. In this example, the tubings that connect the intake ports 420 are attached to the support rod 440 via a plurality of zip ties 411. As noted above, other attachment mechanisms may be used. In this embodiment, a solar panel 402 is coupled to a battery pack 404 that powers the gas analyzer 410. In some embodiments, the battery pack 404 provides power at 90-240 VAC 50-60 Hz 1.4 A. With the use of a solar panel 402 to recharge the battery pack 404, the monitor 400 may be powered for longer time periods, such as for multiple years.

Figure 5:
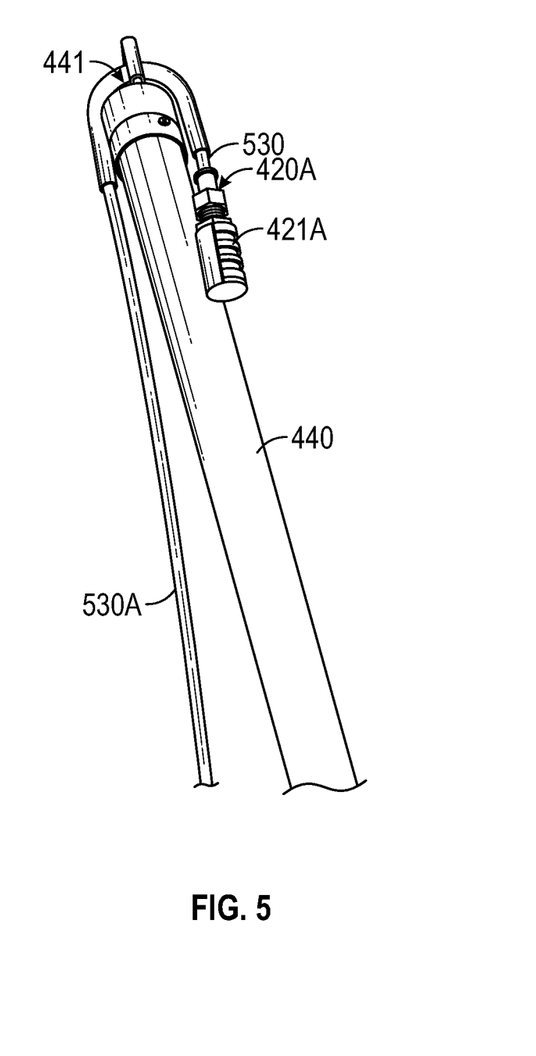
FIGS. 5 and 6 are close-up views of a top portion and middle portion, respectively, of the VEMM of FIG. 4.
Figure 6:
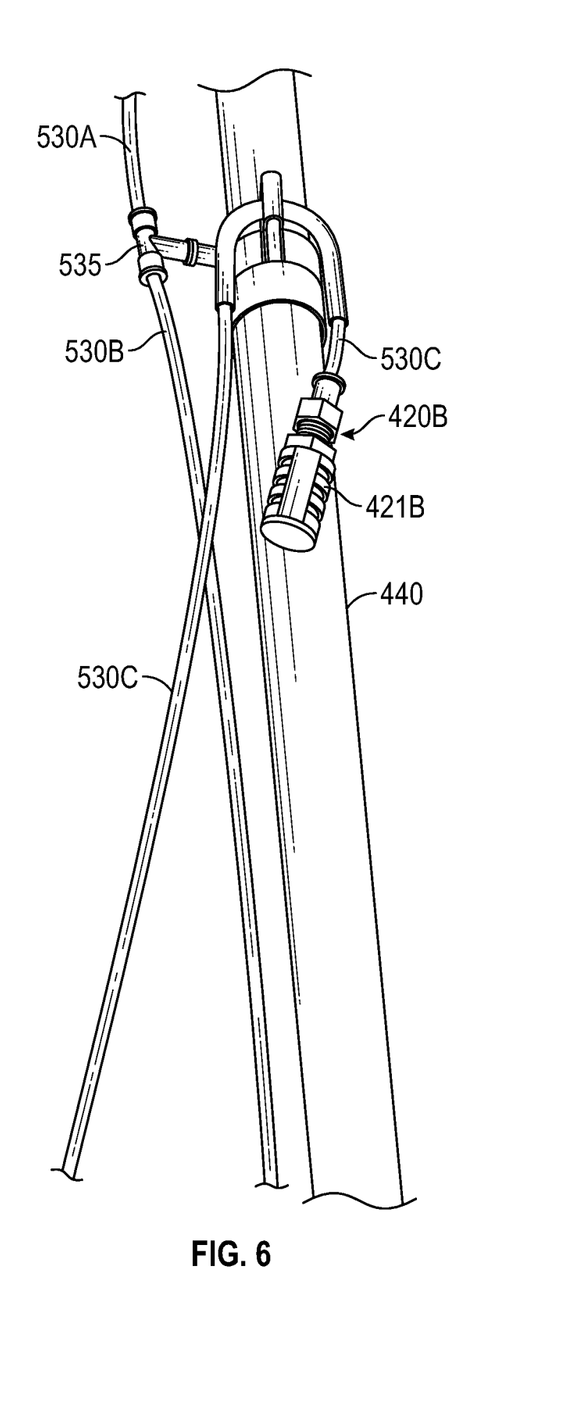

FIGS. 5 and 6 are close-up views of a top portion and middle portion, respectively, of the VEMM 400 of FIG. 4. In this example, the upper intake port 420A includes muffler 421A that is threadedly attached to tubing 530A. As noted elsewhere, use of a muffler may not be required and/or other types of gas filtering and/or conditioning components may be used. In this example, the tubing 530 is curved over a top 441 of the support rod 440 and extends downward towards the second intake port 420B illustrated in FIG. 6. As shown at the top of FIG. 6, the tubing 530A is coupled into a T-junction 535 and a second section of tubing 530B extends downward towards the next intake port. The second intake port 420B also includes a muffler 421B coupled to a tubing section 530C that extends downward alongside tubing 530B. In some embodiments, the tubing sections 530C and 530B are coupled, such as via a T-junction at a lower position (not shown in FIGS. 5 and 6), to form a mixed gas for testing of methane content. As noted with reference to FIG. 4, two additional intake ports 420C, 420D (FIG. 4) may be similarly configured and coupled together to generate a single mixed gas for testing by the gas analyzer 410.

In some embodiments, intake ports may optionally include one or more sensor that senses the same or additional parameters as the gas analyzer 410. For example, an intake port may include a flow sensor that is usable to determine concentration of gas that is received at that particular intake port. In some embodiments, one or more of the intake ports is individually coupled to a methane sensor, such as a laser sensor, and determines methane content of gas ambient the particular intake port.

Figure 7:
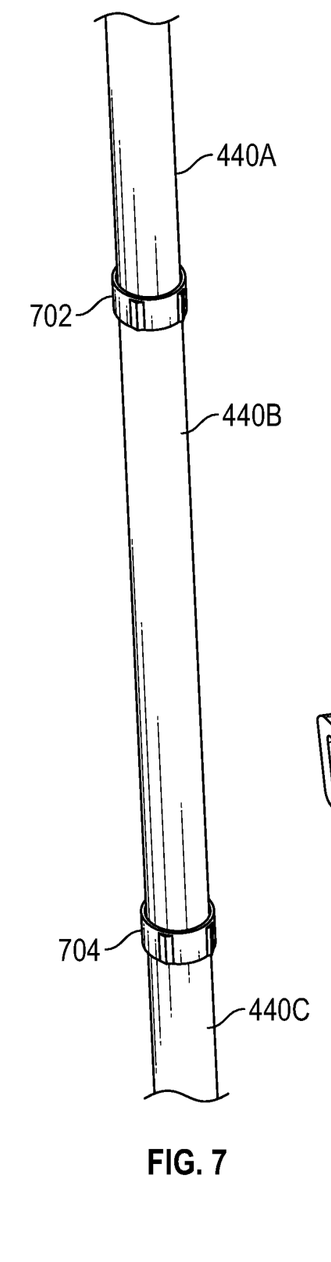
FIG. 7 illustrates a portion of the support rod including telescoping portions.

FIG. 7 illustrates a portion of the support rod 440 including telescoping portions 440A, 440B, and 440C. In this embodiment, the upper portion 440A is sized to slide within an inside diameter of portion 440B, and the portion 440B is sized to slide within an inside diameter of portion 440C. In this embodiment, lock rings 702, 704 are configured to allow manual fixation of the rod portions 440 with reference to one another by turning/tightening the lock rings. With the use of such a telescoping structure, height of the support rod, as well as heights available for intake ports that are attached to the support rod, are adjustable at the time of installation on a site and/or at any future time when adjustments are desired. For example, the support rod 440 may be set to a height range of from 3 ft to 20 ft (or more) with the use of the telescoping portions.

In some embodiments, components of a gas monitor may be provided in a kit. For example, installation at a site may include a user adjusting the height of the support rod to a desired height and attach the intake ports, tubing, etc., to the support rod 440. Thus, the same kit may be used to assemble vertical emission monitoring manifolds of multiple heights and configurations. In some embodiments, the tubing portions used in a particular configuration are cut as the monitor is assembled to minimize the amount of tubing according to height, spacing, etc. of the intake ports.

Figure 8:
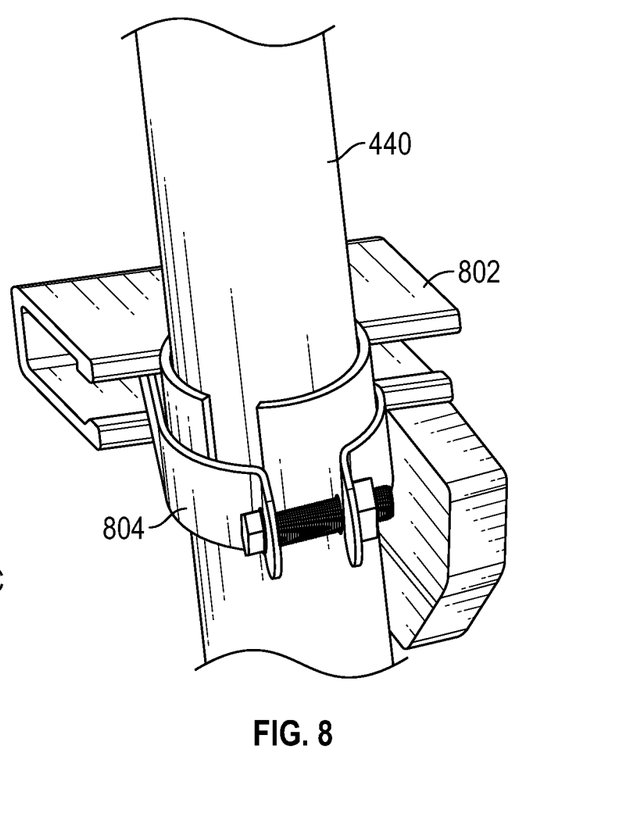
FIG. 8 illustrates a portion of the support rod that is attached to a portion of the gas analyzer.

FIG. 8 illustrates a portion of the support rod 440 that is attached to a portion 802 of the gas analyzer 410. In this example, a clamp 804 attached to the portion 802 of the gas analyzer is tightened around the support rod 440. Other components of a monitor, such as solar panel 402, battery pack 404, and/or other components, may be attached in a similar manner to the support rod 440.

Implementation Mechanisms

In various embodiments of the present disclosure, the gas analyzer (e.g., gas analyzers 210, 310, 410) and/or other components of a vertical emission monitoring manifold can include one or more special-purpose computing devices. The special-purpose computing devices can be hard-wired to perform the various techniques described herein, or can include digital electronic devices such as one or more application-specific integrated circuits (ASICs) or field programmable gate arrays (FPGAs) that are persistently programmed to perform the techniques, or can include one or more general purpose hardware processors programmed to perform the techniques pursuant to program instructions in firmware, memory, other storage, or a combination. Such special-purpose computing devices can also combine custom hard-wired logic, ASICs, or FPGAs with custom programming to accomplish the techniques. The special-purpose computing devices can be desktop computer systems, server computer systems, portable computer systems, handheld devices, networking devices or any other device or combination of devices that incorporate hard-wired and/or program logic to implement the techniques.

In some embodiments, the gas analyzer may be controlled and coordinated by operating system software, such as IOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the gas analyzer can be controlled by a proprietary operating system. Conventional operating systems control and schedule computer processes for execution, perform memory management, provide file system, networking, I/O services, and provide a user interface functionality, such as a graphical user interface ("GUI"), among other things. Thus, the gas analyzer may execute software instructions (e.g., in one or more modules) to perform the various features discussed herein)

In some embodiments, the gas analyzer includes a bus or other communication mechanism for communicating information, and a hardware processor, or multiple processors, coupled with bus for processing information. Hardware processor(s) can be, for example, one or more general purpose microprocessors.

In some embodiments, the gas analyzer includes a main memory, such as a random access memory (RAM), cache and/or other dynamic storage devices, coupled to bus for storing information and instructions to be executed by processor. Main memory also can be used for storing temporary variables or other intermediate information during execution of instructions to be executed by processor. Such instructions, when stored in storage media accessible to processor, render main board into a special-purpose machine that is customized to perform the operations specified in the instructions. Main memory can also store cached data, such as zoom levels and maximum and minimum sensor values at each zoom level.

In some embodiments, the gas analyzer further includes a read only memory (ROM) or other static storage device coupled to bus for storing static information and instructions for processor. A storage device, such as a magnetic disk, optical disk, or USB thumb drive (Flash drive), etc., is provided and coupled to bus for storing information and instructions. For example, the storage device can store measurement data obtained from a plurality of sensors.

In some embodiments, the gas analyzer can be coupled via bus to a display, such as a cathode ray tube (CRT) or LCD display (or touch screen), for displaying information to a computer user. An input device, including alphanumeric and other keys, is coupled to bus for communicating information and command selections to processor. Another type of user input device is cursor control, such as a mouse, a trackball, or cursor direction keys for communicating direction information and command selections to processor and for controlling cursor movement on display.

In some embodiments, the gas analyzer can include a user interface module to implement a GUI that can be stored in a mass storage device as executable software codes that are executed by the computing device(s). This and other modules can include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

Terminology

In general, the word "module," as used herein, refers to logic embodied in hardware or firmware, or to a collection of software instructions, possibly having entry and exit points, written in a programming language, such as, for example, Java, Lua, C or C++. A software module can be compiled and linked into an executable program, installed in a dynamic link library, or can be written in an interpreted programming language such as, for example, BASIC, Perl, or Python. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other tangible medium, or as a digital download (and can be originally stored in a compressed or installable format that requires installation, decompression or decryption prior to execution). Such software code can be stored, partially or fully, on a memory device of the executing computing device, for execution by the computing device. Software instructions can be embedded in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. Generally, the modules described herein refer to logical modules that can be combined with other modules or divided into sub-modules despite their physical organization or storage.

The term "non-transitory media," and similar terms, as used herein refers to any media that store data and/or instructions that cause a machine to operate in a specific fashion. Such non-transitory media can comprise non-volatile media and/or volatile media. Non-volatile media includes, for example, optical or magnetic disks, such as storage device. Volatile media includes dynamic memory, such as main memory. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Each of the processes, methods, and algorithms described in the preceding sections can be embodied in, and fully or partially automated by, code modules executed by one or more computer systems or computer processors comprising computer hardware. The processes and algorithms can be implemented partially or wholly in application-specific circuitry.

The various features and processes described above can be used independently of one another, or can be combined in various ways. All possible combinations and sub-combinations are intended to fall within the scope of this disclosure. In addition, certain method or process blocks can be omitted in some implementations. The methods and processes described herein are also not limited to any particular sequence, and the blocks or states relating thereto can be performed in other sequences that are appropriate. For example, described blocks or states can be performed in an order other than that specifically disclosed, or multiple blocks or states can be combined in a single block or state. The example blocks or states can be performed in serial, in parallel, or in some other manner. Blocks or states can be added to or removed from the disclosed example embodiments. The example systems and components described herein can be configured differently than described. For example, elements can be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "comprising" as used herein should be given an inclusive rather than exclusive interpretation. For example, a general-purpose computer comprising one or more processors should not be interpreted as excluding other computer components, and can possibly include such components as memory, input/output devices, and/or network interfaces, among others. The term "a" as used herein should also be given an inclusive rather than exclusive interpretation. For example, unless specifically noted, the term "a" should not be understood to mean "one" or "one and only one"; instead, the term "a" generally means "one or more" in open-ended claims or embodiments when used with language such as "comprising" or "including." Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions can be deleted, executed out of order from that shown or discussed, including substantially concurrently or in reverse order, depending on the functionality involved, as would be understood by those skilled in the art. Furthermore, the embodiments illustratively disclosed herein may be suitably practiced in the absence of any element or aspect which is not specifically disclosed herein.

It should be emphasized that many variations and modifications can be made to the above-described embodiments, the elements of which are to be understood as being among other acceptable examples. All such modifications and variations are intended to be included herein within the scope of this disclosure. No matter how detailed the foregoing appears in text and/or drawings, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A vertical emission monitoring system comprising:
   a longitudinal support rod to be positioned at a gas extraction site;
   a first tubing having a first intake port attached at a first end and a second intake port attached at the second end;
   a second tubing having a third intake port attached at a first end and a fourth intake port attached at the second end;
   a third tubing coupled:
      at a first end to the first tubing at a middle of a length of the first tubing; and
      at a second end to the second tubing at a middle of a length of the second tubing; and
   a fourth tubing coupled:
      at a first end to the third tubing at a middle of a length of the third tubing; and
      at a second end to an input port of a gas analyzer;
   wherein the tubings are attached to the support rod to maintain positions of the intake ports at different vertical positions about a ground level;
   the gas analyzer to:
      identify methane content in the air mixture received via the fourth tubing, wherein the air mixture includes substantially equal portions of air from each of the first, second, third, and fourth intake ports; and
      compare the identified methane content in the air mixture to a threshold level and, if the identified methane content is above the threshold level, initiate delivery of an electronic alert to one or more remote computing devices.

2. The vertical emission monitoring system of claim 1, further comprising:
   a battery to provide power to the gas analyzer; and
   one or more solar panel to generate electrical power from sunlight and recharge the battery.

3. The vertical emission monitoring system of claim 1, wherein the longitudinal support rod comprises a plurality of telescoping sections so that a total height of the longitudinal support rod is manually settable to range of heights.

4. The vertical emission monitoring system of claim 1, wherein the first, second, third, and fourth intake ports are positioned at about five feet, ten feet, fifteen feet, and twenty feet, respectively.

5. The vertical emission monitoring system of claim 1, wherein the gas analyzer is further to wirelessly transmit the identified methane content.

6. The vertical emission monitoring system of claim 1, wherein the gas analyzer is further to measure one or more of a temperature, a pressure, a humidity, or a chemical composition of the air mixture.

7. A vertical emission monitoring kit including:
   a longitudinal support rod to be positioned at a first location of a gas monitoring site;
   a first intake port to be attached to the support rod at a first height above the ground;
   a second intake port to be attached to the support rod at a second height above the ground that is larger than the first height;
   a tubing to be cut into two or more tubing sections including a first tubing section and a second tubing section;
   one or more physical fastening structure to secure tubing sections to the longitudinal support rod; and
   two or more T-junction connectors each including two input ports and one output port, wherein input ports of a first T-junction connector are to couple with the first intake port and the second intake port so that a mixture of air at the first height and second height exits the output port;
   wherein the second tubing section is to be coupled to a gas analyzer to identify methane content in the mixture of air gas.

8. The vertical emission monitoring kit of claim 7, wherein the attachment members are zip ties.

9. The vertical emission monitoring kit of claim 7, wherein the gas analyzer comprises one or more laser sensor.

10. The vertical emission monitoring kit of claim 7, further including:
- a second longitudinal support rod to be positioned at a second location at the gas extraction site;
- a fourth intake port to be attached to the second support rod at a fourth height above the ground; and
- a fifth intake port to be attached to the second support rod at a fifth height above the ground that is higher than the fourth height;
- wherein input ports of a second T-junction connector are to couple with the fourth intake port and the fifth intake and the output port of the second T-junction connector is coupled to a second gas analyzer to identify methane content in a second mixture of air at the second location of the gas extraction site.

11. The vertical emission monitoring kit of claim 10, wherein the first and second locations are along a border of a gas extraction site.

12. A gas emission monitoring system comprising:
- a support for placement at a site, the site comprising one or more of a gas extraction site, an industrial site, or an environmental monitoring location;
- a plurality of tubings, each having at least one intake port attached at one or more ends;
- a connecting tubing coupled:
  - at a first end to at least one of said plurality of tubings; and
  - at a second end to another of said plurality of tubings,
- an analysis tubing coupled:
  - at a first end to the connecting tubing; and
  - at a second end to an input port of a gas analyzer;
- wherein the plurality of tubings are attached to the support structure to maintain positions of the intake ports at various vertical positions relative to a ground level; and
- the gas analyzer to identify one or more types of gas content in an air mixture received via the analysis tubing, wherein the air mixture includes air from each of the intake ports of the plurality of tubings.

13. The gas emission monitoring system of claim 12, wherein the gas analyzer is further to compare the identified gas content in the air mixture to one or more predetermined threshold levels and, if the identified gas content exceeds any of the threshold levels, initiate delivery of an alert to one or more devices.

14. The gas emission monitoring system of claim 13, wherein the one or more devices comprise one or more of a remote computing device, a mobile device, or a centralized monitoring system.

15. The gas emission monitoring system of claim 12, further comprising a wind sensor to measure wind speed and direction at the gas monitoring site.

16. The gas emission monitoring system of claim 12, wherein the gas analyzer is further to determine placement and configuration of the gas emission monitoring system.

17. The gas emission monitoring system of claim 12, wherein one or more of the tubings include filters to remove particulates from the air mixture before it reaches the gas analyzer.

* * * * *